(12) United States Patent  
Hopkins et al.

(10) Patent No.: US 6,224,020 B1  
(45) Date of Patent: May 1, 2001

(54) PAYLOAD FAIRING WITH IMPROVED ACOUSTIC SUPPRESSION

(75) Inventors: Bruce D. Hopkins, Salt Lake City; Patrick R. Oyler, Sandy; Richard L. Raun, Lindon; Frank Jessen, Sandy, all of UT (US)

(73) Assignee: Alliant Techsystems, Inc., Hopkins, MN (US)

( * ) Notice: Subject to any disclaimer, the term of this patent is extended or adjusted under 35 U.S.C. 154(b) by 0 days.

(21) Appl. No.: 09/220,495

(22) Filed: Dec. 24, 1998

(51) Int. Cl.$^7$ .................................................. B64G 1/10
(52) U.S. Cl. ............................................. 244/158 R
(58) Field of Search ........................ 244/158 R, 163, 244/1 R, 133, 117 R, 119, 121; 428/116, 117; 181/290–292, 286

(56) References Cited

U.S. PATENT DOCUMENTS

| | | | |
|---|---|---|---|
| 4,130,175 | * 12/1978 | Hehmann | 181/290 |
| 4,767,656 | * 8/1988 | Chee et al. | 244/129.2 |
| 4,848,514 | * 7/1989 | Snyder | 181/290 |
| 4,919,366 | * 4/1990 | Cormier | 244/116 R |
| 4,925,134 | * 5/1990 | Keller et al. | 244/158 R |
| 5,175,401 | * 12/1992 | Arcas et al. | 181/292 |
| 5,310,592 | * 5/1994 | Baker et al. | 244/158 A |
| 5,445,861 | | 8/1995 | Newton et al. | 428/116 |
| 5,545,458 | * 8/1996 | Fukushima et al. | 428/117 |
| 5,670,758 | | 9/1997 | Borchers et al. | 181/286 |
| 5,912,442 | * 6/1999 | Nye et al. | 181/292 |

OTHER PUBLICATIONS

Snapper, Product Catalog.

* cited by examiner

*Primary Examiner*—Galen L. Barefoot
(74) *Attorney, Agent, or Firm*—Vidas, Arrett & Steinkraus, P.A.

(57) ABSTRACT

A fairing for protecting a payload from excessive acoustic energy is disclosed. The fairing can be used with a launch vehicle for launching payloads such as satellites or the like. The invention provides structure to surround a payload and absorbs acoustic energy so that the noise is suppressed to acceptable levels and the payload is not damaged. The fairing comprises a two dimensional honeycomb core having composite face sheets and load skins bonded to each side of the core. A water barrier is connected to the inner side of the fairing to prevent moisture from entering the payload area. The fairing may include an energy absorbing blanket connected to the inner side of the fairing to further suppress the energy generated by a launch vehicle.

30 Claims, 2 Drawing Sheets

PAYLOAD FAIRING WITH IMPROVED ACOUSTIC SUPPRESSION

FIELD OF THE INVENTION

This invention relates to the field of payload fairings for launch vehicles and more particularly, to an improved payload fairing with improved acoustic suppression characteristics.

BACKGROUND OF THE INVENTION

It is known that launch vehicles of payloads such as satellites require measures to protect the payload from the sound fields generated by lift-off and flight. It is also known that as new high energy launch vehicles are utilized the increased total lift-off thrust of these vehicles produces higher acoustic field intensities than current launchers. Therefore, conventional measures for protection of payload are inadequate.

A fairing is the shroud or cover that surrounds the payload or cargo which will be launched for use. Generally, the cargo is a satellite although any other instrument or vehicle may be launched. The fairing protects the payload from the atmosphere. When the launch vehicle is above atmosphere the fairing is jettisoned and the payload is released when the propulsion operations are completed. Currently, fairings are generally constructed with a solid metal wall or a layered wall including a simple, one dimensional aluminum honeycomb core with composite face sheets. These "bare wall" fairings do not adequately protect some payloads from damage. The robustness of the payload varies. Some payloads are more fragile and sensitive than others. These payloads require more protection.

The payload must be protected from the high temperatures, large forces, and vibrations due to noise encountered during launch. The acoustic energy produced can damage the payload. The acoustic energy can reach 150 dB which produces vibrations that can lead to mechanical damage. In the case of satellites, appendages or antennas can break. Circuit boards can be damaged and mirrors or lenses can be damaged or moved out of alignment. Any resulting damage can seriously hurt or totally impair the capabilities of the satellite.

Acoustic blankets have been used to absorb the acoustic energy to protect the payload. The blankets are attached to the inside surface of the fairing wall. These blankets are usually made of fiberglass batting or a combination of fiberglass sheets and batting which are of different thicknesses and are layered together. The use of blankets has been found to be most effective at frequencies above 300 Hz but do not provide enough protection below about 100 Hz. For frequencies of greater than 300 Hz, the wavelengths are fairly short and the acoustic energy can be fairly easily absorbed by the blankets. However, for frequencies below 100 Hz, the wavelengths are fairly long and there is not a sufficient depth of material in blankets to absorb a significant portion of the energy. Therefore, the blankets are not very effective at these frequencies. In the past, to increase effectiveness of the blankets, the thickness has been increased to provide more absorption. As the thickness of the blankets is increased, the cost, volume, and weight of the blanket is increased. Of course, an increase in weight and volume of the blanket decreases the weight and volume available for payload. Thus, the launch vehicle payload lift capability is adversely affected by use of thick, heavy blankets.

Two other approaches to reducing acoustic transmission through the fairing wall have been taken. The stiffness of the wall has been increased and the mass per unit area of the wall has been increased. Neither of these approaches are considered desirable because they usually increase fairing weight, which reduces payload weight delivered to orbit.

Consequently, a need remains for a payload fairing which can suppress the acoustic energy generated by the launch of the payload to protect the payload without penalizing vehicle lift capability. The invention provides high acoustic attenuation over a wide frequency band including low frequencies.

SUMMARY OF THE INVENTION

The invention is a payload fairing including a number of layers of material that provide structure for a wall to surround the payload and also provide acoustic damping to protect the payload from excessive acoustic energy generated during lift off and launch.

The payload fairing or shroud comprises a wall for forming the fairing structure including fiber-resin face sheets bonded to each side of a two dimensional honeycomb layer or core. The fiber-resin face sheets form an inner and outer skin. A water barrier may be included as part of the inner skin. The honeycomb material is a two-dimensional honeycomb and is generally aluminum. Each of the inner and outer skins comprises carbon-epoxy face cloth or weave and carbon-epoxy tape or load skin. The inner and outer skins are the structural layers which provide strength to the fairing wall.

One advantage of the invention is that it provides high acoustic attenuation over a wide frequency band. As stated above, for frequencies above 300 Hz the wavelengths are fairly short and are more easily absorbed and for frequencies below 300 Hz the wavelengths are longer and the depth of material does not provide adequate protection. However, with the present invention the construction and materials of the fairing provide improved damping capabilities even at frequencies below 300 Hz. The high damping provided by the two dimensional honeycomb core, together with the damping of the other materials in the fairing wall allows for better dissipation of the acoustic energy.

Another advantage of the invention is that there is little impact on the payload lifting capability of the launch vehicle. The invention does not add weight which affects the lift capability. The invention utilizes the already necessary payload fairing wall to provide the added damping protection needed for today's launch requirements.

Yet another advantage of the invention is that the cost and manufacture of the inventive fairing is reasonable. The invention provides a reasonably priced practical approach to protecting payloads from high acoustic levels.

These and other advantages and features which characterize the invention are pointed out with particularity in the claims annexed hereto and which form a further part hereof. However, for a better understanding of the invention, its advantages and objects obtained by its use, reference should be made to the drawings which form a further part hereof, and the accompanying detailed description in which there is shown and described an illustrative embodiment of the invention.

BRIEF DESCRIPTION OF THE FIGURES

Referring to the drawings, wherein like numerals represent like parts throughout the several views.

DETAILED DESCRIPTION OF THE INVENTION

Figure 1:
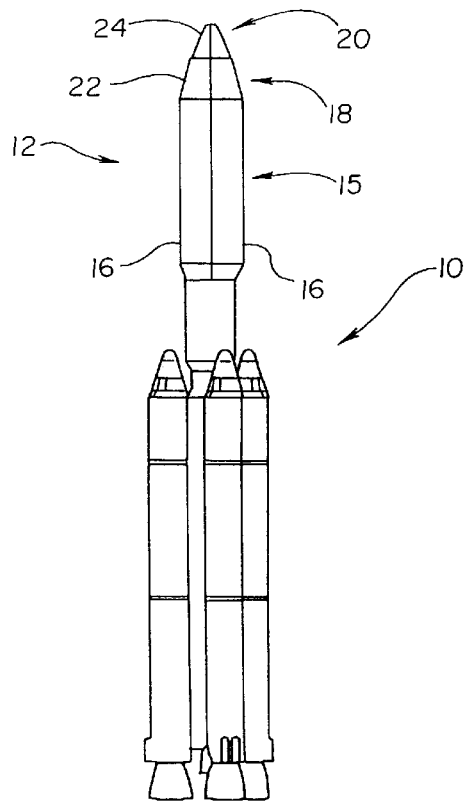
FIG. 1 is a perspective view of a launch vehicle with a payload fairing of the invention.
Figure 2:
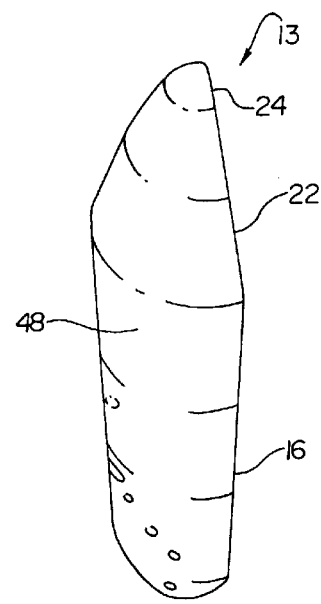
FIG. 2 is a perspective view of the outer side of a section of a payload fairing of the invention.

Referring to FIG. 1, a launch vehicle 10 is shown which includes a fairing or shroud 12. The shroud 12 surrounds a payload 14 (not shown) which is generally a satellite or other space vehicle. It should be understood that any suitable payload may be launched and that any type of launch vehicle may be utilized in the launch. The fairing 12 generally includes three portions: a base or generally cylindrical portion 15, a nose cone portion 18 and a nose cap portion 20. The fairing is made up of sectors 13 which are connected by conventional means to form the fairing. One of the sectors 13 is shown in FIG. 2. The fairing or shroud 12 surrounds the payload to protect it before and during launch until a predetermined point in the launch sequence. The predetermined point may be that sufficient altitude has been achieved, for example. At that predetermined point, the fairing 12 is discarded or deployed and the sectors 13 are forced to separate and fall away from the payload 14.

The payload needs protection from the atmosphere created at launch. The high temperatures and pressures created can damage the sensitive payload. Further, the payload must be protected from the acoustic energy produced during launch. Antennas or appendages could be easily damaged from the great vibrations which develop in the launch environment. Acoustic frequencies during liftoff can range from 5 Hz to 10,000 Hz or greater. The noise associated with these frequencies can reach 150 dB or greater. It is generally desired not to exceed noise levels of 125 dB to adequately protect the payload. It is known that the worst environment for the payload is created approximately five seconds into the launch. At this point noise levels may exceed 150 dB. After this point the noise drops until the vehicle enters the transonic flight region period where high frequencies affect the shroud locally and can cause damage to the payload. Therefore, the inventive fairing is constructed to dampen the acoustic energy produced during early launch and transonic flight to acceptable levels.

As stated above, the fairing 12 is made up of a number of sectors 13. In a preferred embodiment, the fairing 12 is comprised of three sectors 13. Generally, two or three sectors are utilized but it should be understood that any number of sectors may be used as desired. The individual sectors 13 are connected to form the protective housing for the payload. Each sector 13 is made up of subsections. In the preferred embodiment, the subsections include sections of the cylindrical, nose cone and nose cap portions described above. The cylindrical portion 15 is made up of sections 16, the nose cone portion 18 is made up of sections 22 and the nose cap portion 20 is made up of sections 24. Therefore, sector 13 is formed to include section 16, section 22 and section 24 as shown in FIG. 2.

The sectors 13 are connected to each other to form the shroud 12 by conventional means. In the preferred embodiment, the connection is made by using an energetic separation joint common to spacecraft fairing structures. The separation joint hardware is typically bonded and mechanically attached to the fairing sector edges as is known to those skilled in the art. The connections are then sealed to provide a secure arrangement until the shroud is to be deployed away from the payload. In one embodiment, compressed gas or explosive devices are used with the connectors so that when desired the compressed gas or explosion separates the sectors 13 from one another and away from the payload. In the preferred embodiment, explosive devices are detonated remotely when the vehicle reaches a predetermined altitude and the sectors fall away from the payload. The payload is then exposed. One type of separation device which may be used is explosive rails (not shown). One type of explosive rail is the SUPERZIP rail made by Boeing Co. Of course, any appropriate connection device or method and any appropriate separation device or method may be utilized with the invention.

The fairing walls may be constructed in a number of ways. In the preferred embodiment all the fairing walls are constructed at the same time. The fairing wall is then cut into the desired number of sectors. The sectors may then be connected to form the fairing which is attached to the launch vehicle. It is also possible to construct each sector individually. Whether all sectors are constructed at once or individually, they are generally made complete from base to nose cap. In this manner, there is no need to connect the base or cylindrical portion to the nose cone portion and then connect the nose cone portion to the nose cap portion. However, it should be understood that it is also possible to make all or some of the portions separately and connect them by proper attachment means to construct the shroud.

In the preferred embodiment, the core of each of the sections 16, 22 and 24 is preformed to the required curvature and shape. It should be understood that the requirements for curvature and shape are determined by the launch vehicle. The inner surface skin of the fairing is fiber placed on a mandrel (not shown). Then the core material is installed over the inner skin. The outer skin of the fairing is fiber placed on the outer surface of the core. The inner skin and the outer skin of the fairing may include a number of layers. The inner skin may include a water barrier. The layers and the core will be discussed in further detail below. The structure is then cured to provide a strong structural wall which is used to form a fairing for attachment to and use with a launch vehicle.

Figure 3:
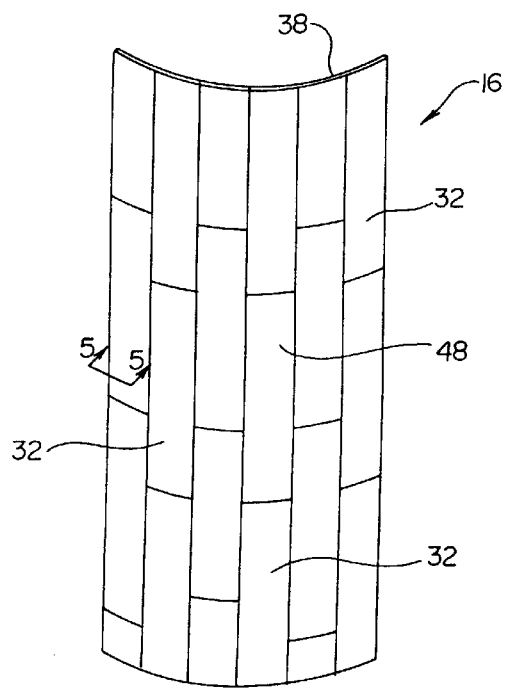
FIG. 3 is a perspective view of a section of a fairing of the invention showing the panels of honeycomb.
Figure 4:
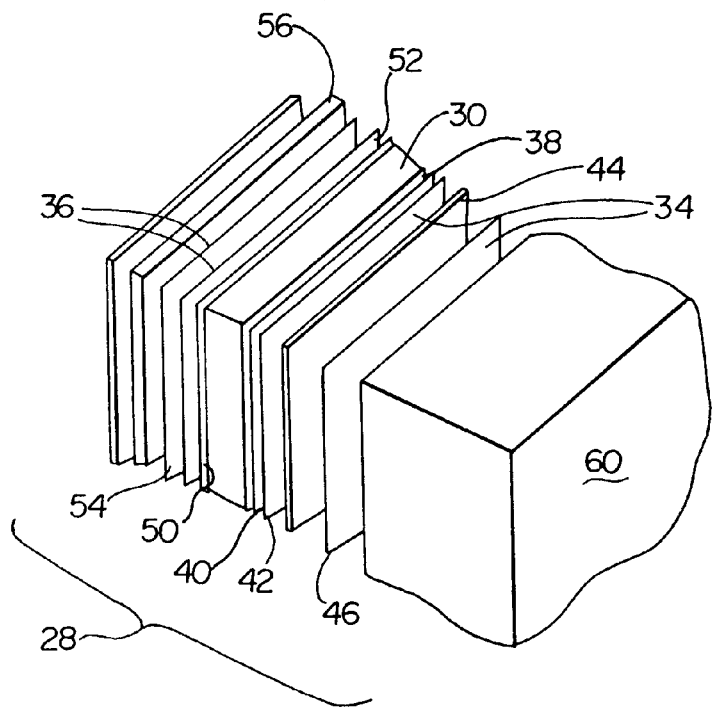
FIG. 4 is an exploded perspective view of a portion of the fairing of the invention.
Figure 5:
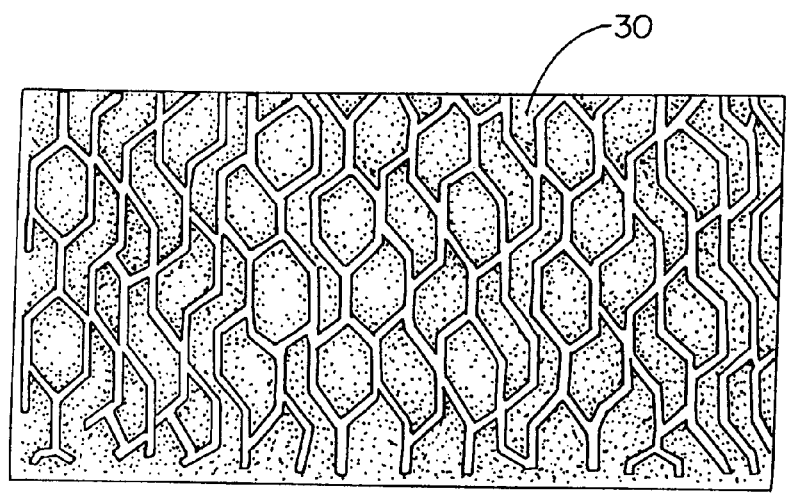
FIG. 5 is a cross section of a panel of two dimensional honeycomb material taken along the line 5—5 of FIG. 3.

The fairing will now be described in more detail starting with the core material utilized in the invention. Referring now to FIG. 4, a partial section of the fairing wall 28 is shown in an exploded perspective view. The fairing wall utilizes a modified honeycomb core 30 in section 16 which makes up the cylindrical portion 15 of the shroud. In the preferred embodiment, the core 30 is a two-dimensional aluminum honeycomb manufactured by Alcore Inc. of Belcamp, Md. under the name TRUSSGRID. The modified honeycomb 30 is said to be two-dimensional because the core material sheets used in traditional honeycomb are rotated relative to each other in manufacture. The resulting cells are half hexagons rotated ±45° in alternate layers. This provides a complex path for travel of acoustic energy and also provides increased strength. The cell shapes are shown in FIG. 5 which is a cross section of a panel 32 of the two-dimensional honeycomb material taken along the line 5—5 in FIG. 3. It should be understood that any comparable two-dimensional or modified honeycomb material may be utilized with the invention.

The physical mechanism for acoustic transmission through the fairing is motion of the inside fairing surface induced by acoustic pressure fluctuations on the outside surfaces. Movement of the inside fairing surface produces pressure waves in the air inside the fairing, which constitute the "transmitted" acoustic field. The motion of the internal fairing wall can be decomposed into localized "through-the-thickness" compression and stretching of the wall and larger scale effects customarily referred to as "shell" effects. In most instances (e.g. below about 3000 Hz in the wall thickness described here) the through-the-thickness contribution to motion is very small compared to the shell contribution and is customarily disregarded. Shell motion is made up of membrane, bending and shear displacements, the latter two of which depend on the properties of core 30.

During acoustic exposure, the induced bending and shear displacement of the fairing wall distort the two-dimensional core and, because of its unique construction, this distortion causes significant viscoelastic energy loss within the core. This loss reduces the motion of the inside fairing surface thereby reducing acoustic transmission. Payload fairings using traditional honeycomb cores show little acoustic loss at low frequencies because the core structure does not exhibit significant viscoelasticity.

In the preferred embodiment, the core 30 utilized in section 16 is aluminum TRUSSGRID material which is approximately 1.5 inches thick. Referring now to FIG. 3, the core 30 is comprised of a number of panels 32 of core material for ease of construction in the preferred embodiment. The panels 32 are approximately four feet by eight feet and are preformed on a predetermined radius so that the desired curve of the section 16 is obtained. The panels may be of different sizes and curvatures, as appropriate. Also, any appropriate number of panels may be utilized as required to meet the specifications of a particular shroud. One of numerous possible arrangements of panels 32 is shown in FIG. 3. The panels are cut to form the desired shape and size.

The nose cone and cap 18 and 20 also include core material. The core material 30 may be the modified honeycomb described above or may be a traditional honeycomb material. The geometry of the cone and cap make them stiff and resistant to flexure. There is sufficient geometric stiffness in these portions of the fairing to protect the payload from the acoustic forces. Therefore, it is acceptable to construct the nose cone and cap walls of varying core materials. These core materials would be determined by the specifications of the launch. In the preferred embodiment, the nose cone 18 is made up of sections 22 constructed from a core 30 which is a standard honeycomb material over expanded in one direction to allow easy forming of the material to the desired shape. The core 30 is 1.5 inches in thickness in a preferred embodiment of the nose cone. The nose cap portion 20 is made up of sections 24 made from core material 30. The core 30 utilized for the nose cap 20 is FLEX-CORE material which is a highly flexible honeycomb material made by Hexcel. The core 30 is 1.5 inches in thickness in section 24 in the preferred embodiment. It should be understood that the materials and thicknesses for the core of each of these portions 18 and 20 may vary depending on specifications as is well known in the art. Any appropriate honeycomb material may be utilized including a two dimensional honeycomb if desired. The core may be comprised of panels, pieces, or sheets of material of varying sizes as desired.

In the preferred embodiment, the inner skin 34 is constructed first. The inner skin 34 includes a face cloth 46 and load skin 42. The face cloth or face sheet 46 is placed on a mandrel. The face sheet is typically a carbon fiber weave with preimpregnated epoxy resin. The face sheet 46 is utilized to provide a sound structure and machinability to the wall 28. The cloth 46 has multiple fiber orientations. The multiple fiber orientation allows for better results when drilling holes, for example, as may be desired for attachment of a base ring or separation rings as is known to those skilled in the art. In a preferred embodiment the face sheet 46 is a carbon fiber/epoxy sheet which is 7.7 Mil thick and has a weight of 193 g/m$^2$. The epoxy is chosen from the group of epoxies which cure between about 250° F. and 350° F. It should be understood that any appropriate fiber/resin weave may be utilized.

A moisture barrier 44 is installed and an inner load skin 42 is fiber placed over the moisture barrier 44. A water barrier 44 is placed next to the load skin 42 to keep moisture away from the payload. Moisture could damage the payload so the seal 44 is used to prevent the passage of condensation and moisture to the cavity where the payload resides. The water barrier is an impermeable rubber sheet known as Tedlar film in the preferred embodiment. The film is 10 Mil in thickness. However, any suitable material or thickness of material may be used which prevents the passage of moisture to the inside of the shroud 12. The moisture seal is placed between the face sheet 46 and the load skin 42 in the preferred embodiment so that possible damage to the barrier 44 is minimized. It should be understood that the barrier may be placed on the inner surface of the face sheet 46 is desired.

The load skin 42 is a strong load bearing layer to provide strength for the wall 28. In the preferred embodiment, the load skin is a carbon tape impregnated with epoxy resin with a thickness of 7.2 Mil/ply. The resin utilized in the preferred embodiment is an epoxy resin chosen from the group of epoxies which cure between about 250° F. and 350° F. It should be understood that any appropriate resins may be used. Four plies of the carbon tape 42 are used and each ply has a weight of 190 g/m$^2$. The load skin 42 may also be applied by other known means and sheets may also be used rather than tape. The thickness and number of layers of the material will also vary depending on the specifications of the shroud to be constructed.

In the preferred embodiment a layer of adhesive film 40 is laid down on the inner load skin surface 42. The adhesive is $8/13$ Mil in thickness and cures at 350° F. The adhesive is FM300 made by American Cyanimide in the preferred embodiment although any other suitable adhesive may be used. The core 30 is then installed over the adhesive film 40. The core 30 has an inner or concave surface 38. The core 30 is installed such that the inner surface 38 of the core 30 is applied to the adhesive film 40. In this manner, the core material 30 is bonded to the inner load skin 42 when the adhesive film 40 is cured.

The outer layers of the wall 28 of the section 16 will now be described. The outer layers are those layers that are connected to the outer surface 48 of the core 30. The outer surface 48 of the core 30 is the convex side of the core 30. A second adhesive film 50 is applied to the outer surface 48 of the core 30. The adhesive film is a $8/13$ Mil thick adhesive which cures at 350° F. Any appropriate film adhesive may be used. In the preferred embodiment, FM300 or equivalent film adhesive is used.

The outer skin 36 is connected to the outer surface of the core. The outer skin 36 includes a second load skin 52 and a second face cloth 54. The second load skin 52 is fiber placed over the adhesive film 50. In the preferred embodiment, this second load skin 52 is the same as load skin 42 described above. The load skin 52 is a carbon fiber/epoxy impregnated tape with a thickness of 7.2 Mil/ply. Four plies are used and each ply has a weight of 190 g/m². Like the load skin 42, this load skin 52 carries the load of the shroud 12.

A second face sheet 54 is then bonded to the load skin 52. The face cloth 54 is carbon fabric impregnated with resin in the preferred embodiment and is 7.7 Mil in thickness with a weight of 193 g/m². The face sheet 54 provides structure and machinability to the exterior surface of the shroud 12. The face sheet is laid up on the load skin 52 in the preferred embodiment but other methods may be used. In the preferred embodiment the first and second load skins and face sheets are the same so that there is symmetry of the layers. In this manner, the layers respond to curing in the same way which provides for a better structure. However, it should be understood that whether the layers are different or the same, a variety of materials and specifications of materials may be used for the inner and outer skins 34 and 36, as desired and appropriate as is understood by those skilled in this area.

The wall 28 of the structure must be cured. Curing may take place by any appropriate method. Generally, it is desired to cure the structure in an autoclave. The mandrel is transferred to an autoclave for the curing process which is well known in the art. It is also possible to place a vacuum bag around the entire structure, create a vacuum and cure the structure in an oven. After cure is completed the structure may be cut into the desired number of sections if it was made as a whole as described earlier in the description. The sectors 13 may then be prepared and connected by the appropriate separation devices such as an energetic separation joint. Appropriate attachment rings or devices are also connected so the fairing may be connected to the launch vehicle.

It should also be understood that the order of the construction of the wall described above is exemplary only and that any other order or method of construction is contemplated with this invention.

The shroud 12 must be able to withstand the high temperatures that accompany vehicle launch and travel. Therefore, a thermal ablative layer or thermal protection layer 56 is utilized. This thermal protection layer 54 is cork in the preferred embodiment and is 10 Mil thick. Any known thermal protection material may be used such as spray on ablative materials common to launch vehicles. The thermal layer 56 is bonded to the second face sheet 54. A room temperature or oven cure epoxy may be utilized to connect the thermal layer 56 to the second face sheet 54.

It is also known that an electrostatic charge can be generated during the flight of a launch vehicle. Therefore, it is necessary to dissipate this charge. A charge dissipation layer 58 is bonded to the thermal protection layer 56. The charge dissipation layer or environmental seal 58 is a layer of conductive paint in the preferred embodiment and is 10 Mil in thickness. This environmental seal 58 also helps to protect the shroud 12 from other environmental effects such as rain, snow or other conditions which could be harmful to the shroud. The paint 58 is a MI-15 Environmental Seal paint made by Lockheed Martin in the preferred embodiment but any suitable paint may be used. The paint 58 is the outer most layer of the shroud 12.

The shroud 12 may also utilize acoustic blankets 60 to further dampen the acoustic energy which is generated during launch. The blankets 60 are generally made up of fiberglass batting in plastic bags. Any suitable material, such as a foam which is a poly material sometimes referred to as an acoustic foam, may be used as is well known to those skilled in the art. The thickness of the blankets 60 depends on the specifications of the launch. In a preferred embodiment, the thickness of the acoustic foam is four (4) inches and the weight of the foam is 2.0 lb/ft³. The thickness of the blankets may vary considerably. Also, blankets 60 may not be necessary for every launch. The blankets 60 are connected to the wall 28 of the shroud 12 by conventional means such as film adhesive. Other fastening means may be utilized such as tie straps.

The blankets 60 would generally be utilized with the cylindrical portion 15 of the shroud 12. The nose cone 18 and cap 20 portions would usually not require the use of blankets 80 although they could be used as desired. The nose cone and nose cap portions 18 and 20 tend to have enough stiffness to protect the payload from the acoustic forces generated during flight. The geometry of the cone makes it stiff and therefore resistant to flexure. The geometric stiffness provides the benefit of resistance to the acoustic energy.

The above Examples and disclosure are intended to be illustrative and not exhaustive. This description is an exemplification of the principles of the invention and is not intended to limit the invention to the particular embodiments illustrated. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A payload fairing wall for use with a fairing for a launch vehicle, the fairing wall comprising:
    (a) an inner skin having an inside surface and an outside surface;
    (b) a modified honeycomb layer, the modified honeycomb layer being comprised of a plurality of half-hexagons, the modified honeycomb layer having an inside surface and an outside surface, the inside surface of the modified honeycomb layer connected to the outside surface of the inner skin; and
    (c) an outer skin having an inside surface and an outside surface, the inside surface of the outer skin connected the outside surface of the modified honeycomb layer.

2. The fairing wall of claim 1 further comprising a water barrier connected to the inner skin.

3. The fairing wall of claim 1 further comprising a thermal protection layer connected to the outside surface of the outer skin.

4. The fairing wall of claim 3 further comprising an environmental seal connected to the thermal protection layer.

5. The fairing wall of claim 4 wherein the environmental seal is conductive paint.

6. The fairing wall of claim 1 wherein the modified honeycomb layer is aluminum.

7. The fairing wall of claim 1 further comprising an acoustic blanket connected to the inside surface of the inner skin.

8. The fairing wall of claim 1 wherein the inner skin comprises a first face sheet of carbon fiber/epoxy fabric.

9. The fairing wall of claim 8 wherein the inner skin further comprises a first load skin layer of carbon fiber/epoxy tape.

10. The fairing wall of claim 1 wherein the outer skin comprises a second face sheet of carbon fiber/epoxy fabric.

11. The fairing wall of claim 10 wherein the outer skin further comprises a second load skin layer of carbon fiber/epoxy tape.

12. A shroud for use with a launch vehicle, the shroud comprising:
(a) a base portion having a wall, comprising:
  (i) a first face sheet having an inside surface and an outside surface;
  (ii) a first load skin layer having an inside surface and an outside surface, the outside surface of the first load skin connected to the inside surface of the first face sheet;
  (iii) a modified honeycomb layer having an inside surface and an outside surface, the outside surface of the modified honeycomb layer connected to the inside furface of the first loas skin layer;
  (iv) a second load skin layer having an inside surface and an outside surface, the outside surface of the second load skin connected the inside of the modified honeycomb layer;
  (v) a water barrier layer having an inside surface and an outside surface, the outside surface of the water barrier layer connected to the inside surface of the second load skin; and
  (vi) a second face sheet having an inside surface and an outside surface, the outside surface of the second face sheet connected to the inside surface of the water barrier layer;
(b) a nose cone portion connected to the base portion, the nose cone portion having a wall comprising:
  (i) a first face sheet having an inside surface and an outside surface;
  (ii) a first load skin layer having an inside surface and an outside surface, the outside surface of the first load skin connected to the inside surface of the first face sheet;
  (iii) a honeycomb layer having an inside surface and an outside surface, the outside surface of the honeycomb layer connected to the inside surface of the first load skin layer;
  (iv) a second load skin layer having an inside surface and an outside surface, the outside surface of the second load skin connected the inside surface of the honeycomb layer;
  (v) a water barrier layer having an inside surface and an outside surface, the outside surface of the water barrier layer connected to the inside surface of the water barrier layer; and
  (vi) a second face sheet having an inside surface and an outside surface, the outside surface of the second face sheet connected to the inside surface of the water barrier layer; and
(c) a nose cap portion connected to the nose cone portion, the nose cap portion having a wall comprising:
  (i) a first face sheet having an inside surface and an outside surface;
  (ii) a first load skin layer having an inside surface and an outside surface, the outside surface of the first load skin connected to the inside surface of the first face sheet;
  (iii) a honeycomb layer having an inside surface and an outside surface, the outside surface of the honeycomb layer connected to the inside surface of the first load skin layer;
  (iv) a second load skin layer having an inside surface and an outside surface, the outside surface of the second load skin connected the inside surface of the honeycomb layer;
  (v) a water barrier layer having an inside surface and an outside surface, the outside surface of the water barrier layer connected to the inside surface of the second load skin; and
  (vi) a second face sheet having an inside surface and an outside surface, the outside surface of the second face sheet connected to the inside surface of the water barrier layer.

13. A payload fairing wall for use with a fairing for a launch vehicle, the fairing wall comprising:
(a) a first face sheet having an inside surface and an outside surface;
(b) a first load skin layer having an inside surface and an outside surface, the outside surface of the first load skin connected to the inside surface of the first face sheet;
(c) a modified honeycomb layer, the modified honeycomb layer being comprised of a plurality of half-hexagons, the modified honeycomb layer having an inside surface and an outside surface, the outside surface of the modified honeycomb layer connected to the inside surface of the first load skin layer;
(d) a second load skin layer having an inside surface and an outside surface, the outside surface of the second load skin connected the inside surface of the modified honeycomb layer;
(e) a water barrier layer having an inside surface and an outside surface, the outside surface of the water barrier layer connected to the inside surface of the second load skin; and
(f) a second face sheet having an inside surface and an outside surface, the outside surface of the second face sheet connected to the inside surface of the water barrier layer.

14. The fairing wall of claim 13 further comprising a thermal protection layer connected to the outside surface of the first face sheet.

15. The fairing wall of claim 14 further comprising an environmental seal connected to the thermal protection layer.

16. The fairing wall of claim 15 wherein the environmental seal is conductive paint.

17. The fairing wall of claim 13 wherein the modified honeycomb layer is aluminum.

18. The fairing wall of claim 13 further comprising an acoustic blanket connected to the inside surface of the second face sheet.

19. The fairing wall of claim 13 wherein the first face sheet is carbon fiber fabric impregnated with epoxy resin.

20. The fairing wall of claim 13 wherein the first load skin layer is carbon fiber tape impregnated with epoxy resin.

21. The fairing wall of claim 13 wherein the modified honeycomb layer is TRUSSGRID material.

22. The fairing wall of claim 13 wherein the second face sheet is carbon fiber fabric impregnated with epoxy resin.

23. The fairing wall of claim 13 wherein the second load skin layer is carbon fiber tape impregnated with epoxy resin.

24. A payload fairing for use with a launch vehicle, comprising:
(a) a base portion having a wall comprising:
  (i) a first face sheet having an inside surface and an outside surface and made of carbon fiber/epoxy fabric;
  (ii) a first load skin layer having an inside surface and an outside surface and made of carbon fiber/epoxy tape, the outside surface of the first load skin connected to the inside surface of the first face sheet;

(iii) a modified honeycomb layer, the modified honeycomb layer being comprised of a plurality of half-hexagons, the modified honeycomb layer having an inside surface and an outside surface, the outside surface of the modified honeycomb layer connected to the inside surface of the first load skin layer;

(iv) a second load skin layer having an inside surface and an outside surface and made of carbon fiber/epoxy tape, the outside surface of the second load skin connected the inside surface of the modified honeycomb layer;

(v) a water barrier layer having an inside surface and an outside surface, the outside surface of the water barrier layer connected to the inside surface of the second load skin; and (vi) a second face sheet having an inside surface and an outside surface and made of carbon fiber/epoxy fabric, the outside surface of the second face sheet connected to the inside surface of the water barrier layer;

(b) a nose cone portion connected to the base portion; and (c) a nose cap portion connected to the nose cone portion.

25. The base portion of claim 24 further comprising a thermal protection layer connected to the outside surface of the first face sheet.

26. The base portion wall of claim 25 further comprising an environmental seal connected to the thermal protection layer.

27. The base portion wall of claim 26 wherein the environmental seal is conductive paint.

28. The base portion wall of claim 24 wherein the modified honeycomb layer is aluminum.

29. The base portion wall of claim 24 further comprising an acoustic blanket connected to the inside surface of the second face sheet.

30. The base portion wall of claim 24 wherein the water barrier layer is rubber.

* * * * *